United States Patent
Weber et al.

(10) Patent No.: US 7,392,545 B1
(45) Date of Patent: *Jun. 24, 2008

(54) SYSTEMS AND METHODS FOR DETECTING SOFTWARE SECURITY VULNERABILITIES

(75) Inventors: Michael D. Weber, Brookline, MA (US); Viren R. Shah, Ashburn, VA (US); Chuangang Ren, Sterling, VA (US)

(73) Assignee: Cigital, Inc., Dulles, VA (US)

( * ) Notice: Subject to any disclaimer, the term of this patent is extended or adjusted under 35 U.S.C. 154(b) by 872 days.

This patent is subject to a terminal disclaimer.

(21) Appl. No.: 10/342,310

(22) Filed: Jan. 15, 2003

Related U.S. Application Data

(60) Provisional application No. 60/349,253, filed on Jan. 18, 2002.

(51) Int. Cl.
*G06F 12/16* (2006.01)
*G08B 23/00* (2006.01)
*G06F 5/00* (2006.01)

(52) U.S. Cl. .............................. 726/25; 726/22; 726/23; 726/24; 713/188; 713/189; 713/190; 705/51; 717/174

(58) Field of Classification Search .................. 726/22, 726/25, 23, 24; 713/188, 189, 190; 705/51; 717/174
See application file for complete search history.

(56) References Cited

U.S. PATENT DOCUMENTS

| | | | |
|---|---|---|---|
| 6,301,699 B1* | 10/2001 | Hollander et al. | 717/131 |
| 6,721,721 B1* | 4/2004 | Bates et al. | 707/1 |
| 6,851,111 B2* | 2/2005 | McGuire et al. | 717/166 |
| 2002/0133721 A1* | 9/2002 | Adjaoute | 713/201 |
| 2003/0014667 A1* | 1/2003 | Kolichtchak | 713/201 |
| 2003/0065945 A1* | 4/2003 | Lingafelt et al. | 713/201 |

OTHER PUBLICATIONS

Beber et al. "A case study in detecting software security vulnerabilities using constraint optimization", Nov. 10, 2001, Weber et al. pp. 1 + 1-14.*

Beber et al. "A case study in detecting software security vulnerabilities using constraint optimization", Nov. 10, 2001, Weber et al. pp. 12.*

M. Weber, V. Shah and C. Ren, "A Case Study in Detecting Software Security Vulnerabilities using Constraint Optimization," *IEEE Workshop on Source Code Analysis and Manipulation*, Nov. 2001, Florence, Italy.

* cited by examiner

*Primary Examiner*—Nasser Moazzami
*Assistant Examiner*—Eleni A Shiferaw
(74) *Attorney, Agent, or Firm*—Edell, Shapiro & Finnan, LLC

(57) ABSTRACT

Embodiments of the present invention relate to systems and methods for static analysis of a software application. According to an embodiment, a system includes a program scanner coupled to an analysis engine. The program scanner is configured to identify one or more vulnerability patterns in a software program and to output an initial potential vulnerability list. The analysis engine is configured to apply one or more rules to a potential vulnerability to determine whether the potential vulnerability is a vulnerability.

10 Claims, 3 Drawing Sheets

SYSTEMS AND METHODS FOR DETECTING SOFTWARE SECURITY VULNERABILITIES

CROSS-REFERENCE TO RELATED APPLICATION

This application claims the benefit of U.S. Provisional Patent Application Ser. No. 60/349,253 filed Jan. 18, 2002, which is herein incorporated by reference in its entirety.

BACKGROUND OF THE INVENTION

1. Field of the Invention

Embodiments of the present invention relate to software security. More particularly, embodiments of the present invention relate to systems and methods for detecting software security vulnerabilities.

2. Background Information

To produce software that is more resistant to remote attacks, software developers benefit from the advancement of tools and technology that allow analysis of software with the goal of detecting potential security vulnerabilities. Currently, both static and dynamic program analysis techniques exist, and in general use, each type has its own advantages and disadvantages.

Static analysis techniques are based on a paradigm that certain conclusions can be drawn about program behavior that are valid regardless of the input values. A tradeoff is that, in contrast to dynamic analysis, which can yield very specific conclusions, static analysis often only allows one to make more abstract claims about the program's behavior. For example, in the context of analysis of the class of security vulnerabilities known as buffer overflows, an analysis algorithm may report that some buffer is overflowable, but it cannot predict the exact chain of events that will lead to the overflow at runtime, nor can it predict the amount of the overflow or the actual contents of the buffer. The latter conclusions fall in the domain of dynamic analysis and can be useful to know, but the program must execute on the right input set to observe them. Because security breaches are often the result of malicious or unexpected inputs, it is typically most useful to be able to draw conclusions about a program that are valid regardless of the input. For this reason, static analysis is most appropriate when initially investigating whether some program under consideration contains security-related flaws. Dynamic analysis can then be applied to examine how the conclusions of static analysis may materialize in practice.

Buffer overflows are known to be among the most common types of remotely exploitable software security vulnerabilities. Techniques from the known art in the field of buffer overflow analysis typically yield inaccurate results, requiring extensive manual intervention to draw useful conclusions from the results. An embodiment of the present invention improves upon the known art of a particular framework for analyzing buffer overflow vulnerabilities. One or more improvements yielded by embodiments of the present invention provide greater accuracy of analysis results and require fewer manual resources. In view of the foregoing, it can be appreciated that a substantial need exists for systems and methods that can advantageously provide for detecting software security vulnerabilities.

BRIEF SUMMARY OF THE INVENTION

Embodiments of the present invention relate to systems and methods for static analysis of a software application. According to an embodiment, a system includes a program scanner coupled to an analysis engine. The program scanner is configured to identify one or more vulnerability patterns in a software program and to output an initial potential vulnerability list. The analysis engine is configured to apply one or more rules to a potential vulnerability to determine whether the potential vulnerability is a vulnerability.

Figure 1:
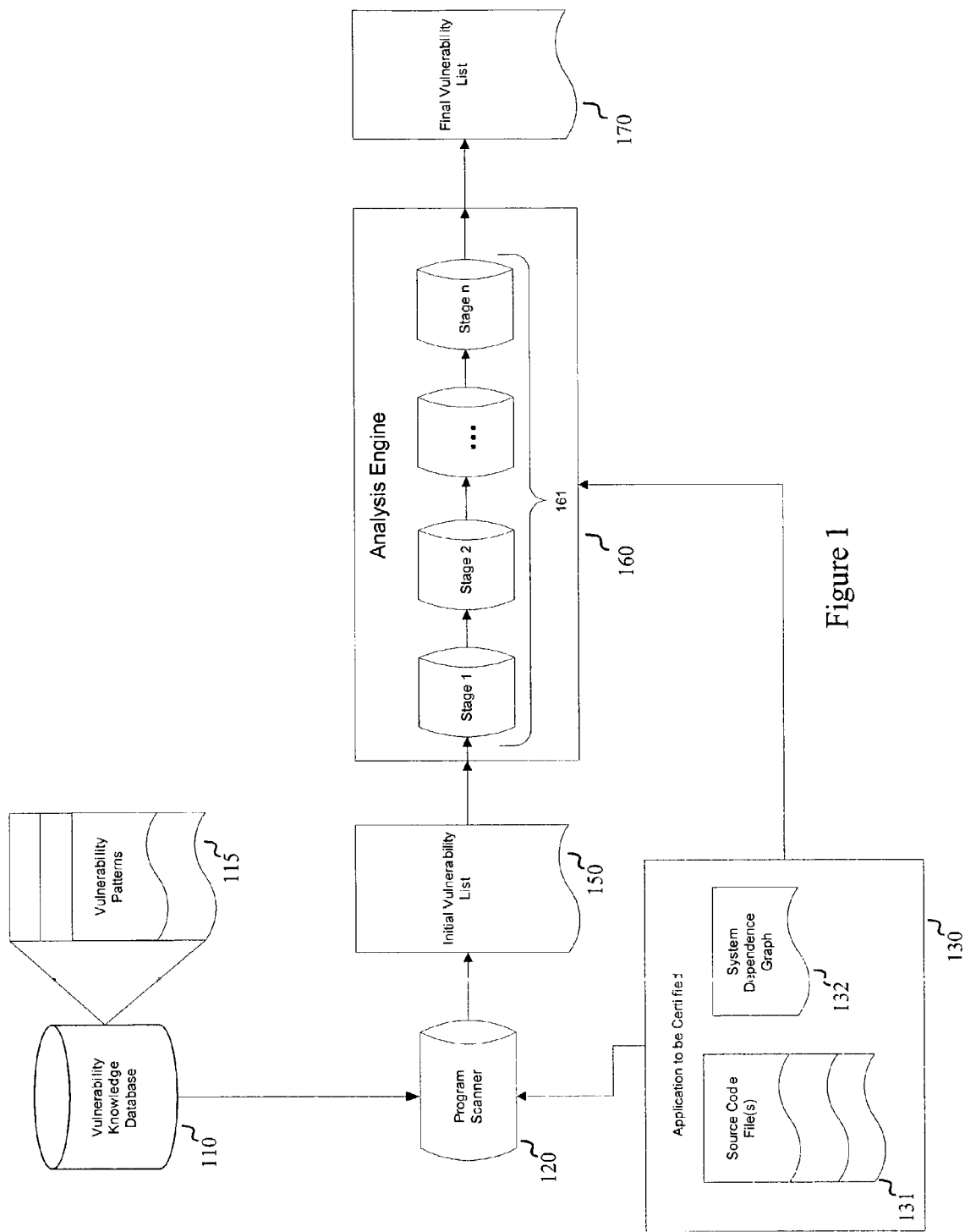
FIG. 1 is a schematic diagram of an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 is a schematic diagram of an embodiment of the present invention. As shown in FIG. 1, an embodiment of the present invention includes a vulnerability knowledge database 110, a program scanner 120, and an analysis engine 160. The vulnerability knowledge database 110 includes a plurality of vulnerability patterns 115. Examples of vulnerability patterns 115 include functions strcpy ( ), strcat ( ), gets ( ), exec ( ), and so on. Analysis engine 160 includes one or more analysis stages 161. In an embodiment, analysis engine 160 includes a series of analysis stages 161.

Program scanner 120 reads input from an application to be certified 130, which can be in the form of source code files 131. An application can also be in the form of object codes, executable code, and the like. Program scanner 120 obtains a set of vulnerability patterns 115 from vulnerability knowledge database 110 and determines locations in source code files 131 that match, correspond to, and/or are similar to these patterns. An initial vulnerability list 150 is output by the program scanner and includes portions of source code files 131 that match, correspond to, and/or are similar to the vulnerability patterns 115. In an embodiment, the initial vulnerability list 150 corresponds to portions of source code files 131 that have potential vulnerabilities. After further analysis, it can be determined whether the portions of source code files 131 do not have one or more vulnerabilities, have one or more vulnerabilities, or are still considered to have potential vulnerabilities.

An application to be certified 130 can be represented in varying embodiments. For example, an application to be certified 130 can be embodied in a source code file, an object code file, an executable code file, and the like. An application to be certified 130, as will be further explained hereinafter, can also be represented by a system dependence graph 132.

Analysis engine 160 performs a series of analysis stages 161 to reduce the size of the initial vulnerability list 150. A potential vulnerability is removed from the initial vulnerability list 150 when any of the one or more analysis stages of the analysis engine 160 determine that the potential vulnerability is not an actual vulnerability. The analysis engine 160 produces a final vulnerability list 170 that contains those potential vulnerabilities from the initial vulnerability list 150 that were not determined to be non-exploitable.

Figure 2:
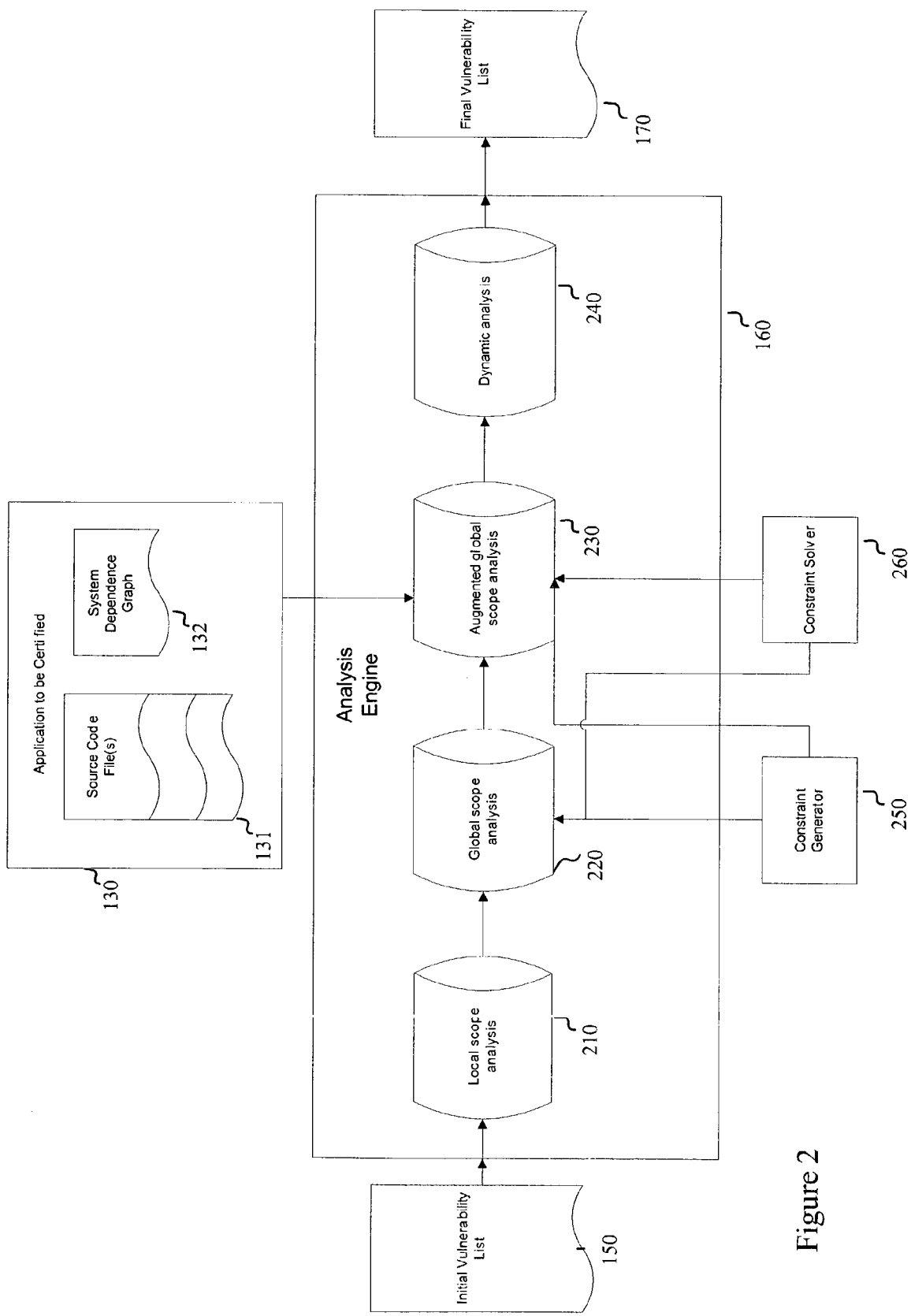
FIG. 2 is a schematic diagram of an analysis engine in accordance with an embodiment of the present invention.

FIG. 2 is a schematic diagram of an analysis engine in accordance with an embodiment of the present invention. Analysis engine 160 includes, in an embodiment, four analysis stages: local scope analysis 210, global scope analysis 220, augmented global scope analysis 230, and dynamic analysis 240. Local scope analysis 210 performs static analysis of a vulnerability within a limited portion of the source code files 131 (e.g., portions of source code files 131 that have potential vulnerabilities). Global scope analysis 220 performs a static analysis of a vulnerability throughout the entirety of the source code files 131. Augmented global scope analysis 230 performs a static analysis of a vulnerability throughout the entire application to be certified 130, using extra information about program control-flow and data-flow provided by the system dependence graph 132. Dynamic analysis 240 performs analysis of a vulnerability by executing the application to be certified 130 and attempting to exploit that vulnerability.

An embodiment of analysis engine 160 addresses the particular class of software security vulnerabilities known as buffer overflows. In this embodiment, local scope analysis 210 reads as input the initial vulnerability list 150, which in this embodiment is a list of program statements that could potentially cause a buffer overflow. For each such statement, local scope analysis applies rules to the immediately surrounding block of code containing that statement in an attempt to prove that the buffer cannot overflow. For example, one skilled in software security would recognize that in the code fragment below, statement S2 is an example of a statement that copies one memory buffer (src) into another (dst), and such a statement will cause an overflow if the size of src is greater than the memory allocated for dst.

S1: if(strlen(src) + 1 <= sizeof(dst)) {
S2: strcpy(dst, src);
S3: }

However in this particular local scope, statement S1 acts as a guard against a buffer overflow, as it only allows statement S2 to execute if buffer dst has sufficient space to accommodate the contents of src. The local scope analysis stage would recognize this pattern and remove statement S2 from the list of vulnerabilities to be analyzed by subsequent analysis stages. After local scope analysis 210 analyzes each vulnerability in the initial vulnerability list 150, a subset of this list containing those vulnerabilities still under consideration is sent as input to global scope analysis 220.

Global scope analysis 220 uses the known art of modeling the problem of buffer overflow analysis as a constraint optimization problem. In this model, a constraint generator 250 generates a constraint for each program statement in source code files 131 that affects any buffer variable in the program. These constraints model how the program statements impact the buffer variable's length. For example, the following program statement causes a string of length 5 to be copied into the buffer variable x.

S1: strcpy(x, "abcde"); //copy the string "abcde" into buffer variable x

The constraint generated for this statement is:
C1: [5,5] is a subset of Length(x)

This is interpreted to mean that the set of all lengths that buffer x takes on throughout the course of the program must contain the range from a lower bound of 5 to an upper bound of 5. To clarify further, consider a second statement and its corresponding constraint:

S2: strcpy(x, "abcdefg"); //copy the string "abcdefg" into buffer variable x
C2: [7,7] is a subset of Length(x)

When the two constraints C1 and C2 are considered together as a logical set, one may derive the conclusion that the set of lengths that buffer variable x takes on throughout the program is [5, 7]; that is, throughout the course of the program, x may be as short as 5 or as long as 7.

The previous example also illustrates the notion of constraint solution; that is, combining each constraint in a program into a logical set and determining the range of each buffer's length. This logic is carried out by constraint solver 260. Given a set of constraints on a set of buffer variables, it produces for each buffer a minimal solution for that buffer's range. A minimal solution is a range that (i) satisfies each individual constraint on that buffer; and (ii) if its upper bound were decreased (or its lower bound increased) some constraint would be violated.

Global scope analysis 220 makes use of constraint generator 250 and constraint solver 260. It first directs the constraint generator 250 to generate constraints for each program statement in source code files 131 that impacts any buffer variable. Examples of constraints include, but are not limited to, "Length(x) is a subset of Length(y)",
"[0,10] is a subset of Length(x)",
"Length(x) is a subset of Length(y) + Length(z)",
"Length(x) is a subset of [0,5] + Length(y)", and so on, where x, y, and z represent buffer variables and Length(x) is an integer range representing the various lengths that buffer variable x takes on throughout the course of the software program being analyzed.

This constraint set is then sent to constraint solver 260 to be solved, such that the solution is a list of buffer variables and corresponding minimal solutions. Global scope analysis 220 then iterates over each vulnerability in the list that it received from local scope analysis 210, with each vulnerability having an associated buffer whose overflow potential is being examined. For each, it compares the upper bound of the buffer's minimal solution range to the amount of memory allocated to that buffer. If the upper bound is less than the amount of allocated memory, global scope analysis 220 concludes that the buffer cannot possibly overflow and removes that vulnerability from the list of vulnerabilities requiring further analysis. Otherwise, that vulnerability is passed to augmented global scope analysis 230 for further analysis.

Augmented global scope analysis 230 is an extension of the global scope analysis 220. This analysis stage uses a system dependence graph 132 representation of the application to be certified 130. A system dependence graph 132 is a graphical representation of control-flow and data-flow information about the application (e.g., program). Control-flow information describes the order in which statements execute, the structure of conditional branching between blocks of statements, and the call-graph structure of the application, which captures how procedures in the program invoke other procedures. Data-flow information, describes how variable values propagate and impact other variables in the program as assignments to variables are made during the execution of the program. All of this information can be used to augment the known art in constraint modeling, resulting in constraint sets that are more precise, thereby making the analysis more capable of determining (e.g., proving) that potential vulnerabilities cannot actually result in buffer overflow.

Figure 3:
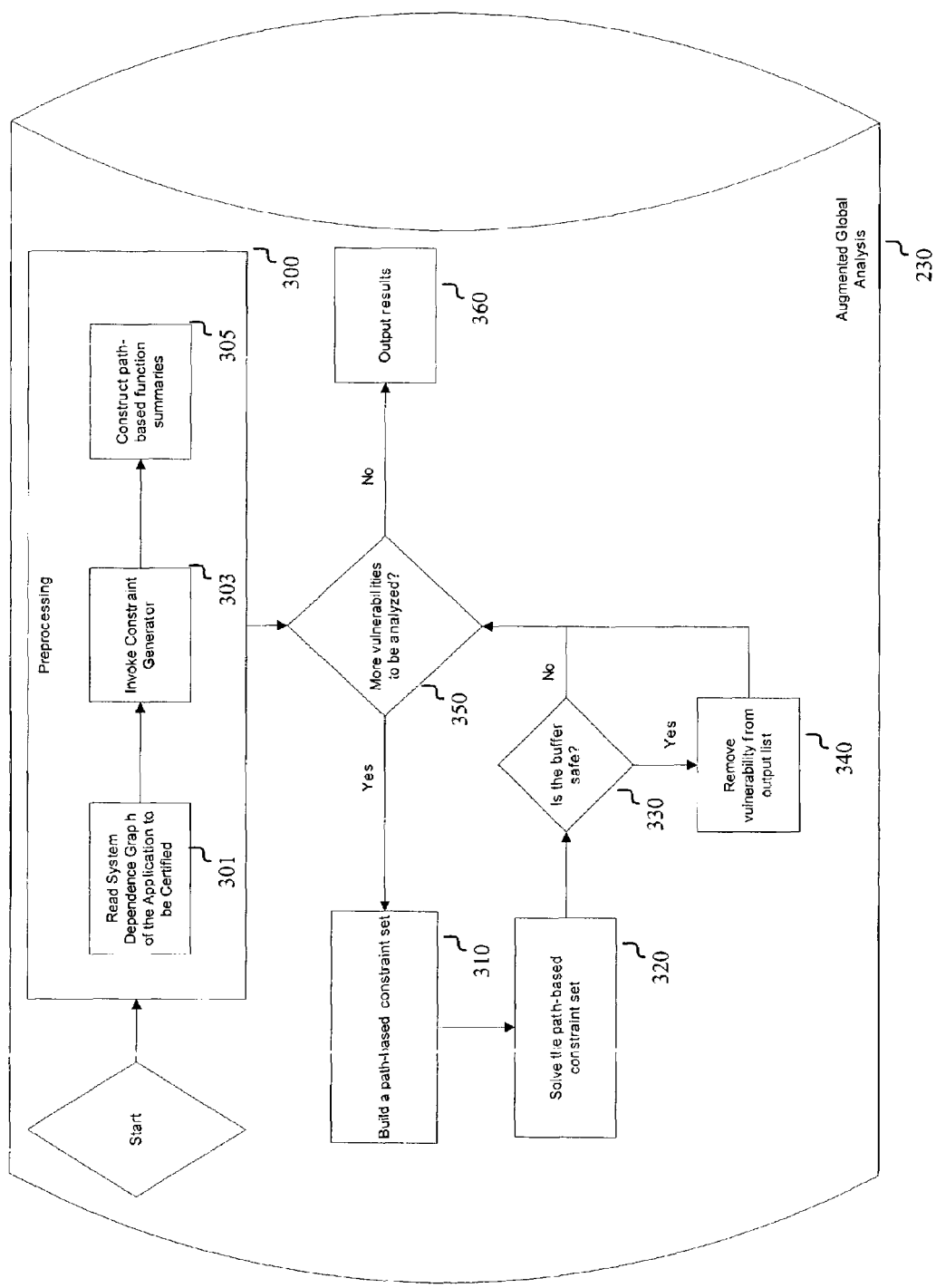
FIG. 3 is a flow diagram flow diagram showing exemplary steps of a stage of an analysis engine subsystem in accordance with an embodiment of the present invention.

FIG. 3 is a flow diagram flow diagram showing exemplary steps of a stage of an analysis engine subsystem in accordance with an embodiment of the present invention. When the augmented global analysis component 230 is invoked, it first performs preprocessing stage 300. According to an embodiment of the present invention, the preprocessing stage 300 involves three steps 301, 303 and 305. In step 301, the system dependence graph of the application to be certified is read. For example, the external system dependence graph representation 132 is read into a component's internal memory. In step 303, the constraint generator 303 is invoked. For example, invoking the constraint generator can encompass creating a constraint for each statement in source code files 131. The constraints are then attached to the appropriate nodes in this component's internally-stored system dependence graph. In step 305, constraint summaries of each function in the application to be certified are constructed. A summary can be in the form of a constraint set that represents the impact that the corresponding program function has on buffer variables. A purpose of constructing function summaries is to reduce the amount of work that needs to be repeated when analyzing multiple vulnerabilities whose control-flow paths contain overlap of common functions. According to an embodiment, each summary is constructed once during pre-processing as opposed to multiple times as several vulnerabilities are analyzed.

After preprocessing step 300 completes, step 350 iterates over the vulnerability list. For each vulnerability, in step 310, a path-based constraint set is built. In step 320, the constraint set is solved. In step 330, whether the buffer is safe is determined. If the buffer is safe, in step 340, the buffer is removed from the list of remaining vulnerabilities that will be output. After each vulnerability has been examined, in step 360, the list of vulnerabilities that were not marked as being safe are output.

A path-based constraint set is an extension of the known art in using constraint sets to model the buffer overflow analysis problem. This extension involves modeling each use or definition of a buffer variable as a separate range variable in the path-based constraint model, and extra constraints are introduced that link variable uses with variable definitions. This is in contrast to the known art of non-path-based constraint modeling in which every use and definition of a given buffer variable maps to the one range variable in the constraint model. One embodiment of a path-based constraint set model is now described in detail The following code fragment can illustrate how path-based constraint sets differ from the known art of non-path-based constraint sets.

```
S1: char a[10], b[50];       //declares two buffers, of lengths 10 and 50
S2:                          //copies a string of length 13 into b
strcpy(b, "much too long");
S3: strcpy(b, "short");      //overwrites b with a string of length 5
S4: strcpy(a, b);            // copies the string of length 5 into a
```

One of skill in the art will understand that this code fragment does not cause buffer variable a to overflow. However, the known art of non-path-based constraint modeling produces the following constraint set:

C1: [13,13] is a subset of Length(b)
C2: [5,5] is a subset of Length(b)
C3: Length(b) is a subset of Length(a)

The minimal range solution for Length(a) is [5,13]. Thus, the upper bound of this range is greater than 10. Based on the amount of memory allocated to buffer a, this model concludes that buffer a is not safe; that is, it fails to correctly conclude that statement S4 is not an exploitable vulnerability.

In contrast to the known art, an embodiment of path-based constraint modeling can produce this constraint set, for example, based on the order of statements in the program execution path:

C1[13,13] is a subset of Length(b at S2)
C2[5,5] is a subset of Length(b at S3)
C3:Length(b at S3) is a subset of Length(b at S4)
C4:Length(b at S4) is a subset of Length(a at S4)

Constraint C3 is a linking constraint, meaning that it links the values of one variable between two consecutive program statements. The minimal range solution of Length(a at S4) for this constraint set is [5,5]. Thus, the upper bound of this range is less than 10. Based on the amount of memory allocated to buffer a, this model concludes that buffer a is safe; that is, is reaches the correct conclusion that statement S4 is not an exploitable vulnerability. This is because this model captures the information that statement S2 has no impact on the contents of buffer b at statement S4. This example demonstrates that this embodiment of the path-based constraint model yields results that are more accurate than the known art of non-path-based constraint modeling.

Preprocessing step 305 of augmented global analysis stage 230 can build a path-based constraint set for each vulnerability to be analyzed. An embodiment of step 305 is given by this pseudocode listing:

1. For each function in the system dependence graph
2. Initialize an empty path-based constraint set S.
3. Traverse down its control-flow graph, starting at the function entry point.
4. For each node that is visited along the traversal
5. Add its path-based constraint to S.
6. Add appropriate linking constraints to S based on the last definition of variables used in this node.
7. If the node is a branch statement
8. Recursively traverse down each of that node's branches gathering path-based constraints and linking constraints.
9. For each buffer variable used or defined in this function
10. Create a linking constraint between all last definitions of the buffer along paths that were traversed and a new dummy variable that summarily represents the last use of the buffer variable.
11. Create a linking constraint between another new dummy variable that summarily represents the first definition of the buffer variable and all first uses of that buffer variable along all paths.
12. Create a function summary for this function consisting of these constraints, termed the FirstUse and LastDefinition constraints Applying this procedure yields a list of function summaries, one for each function in the system dependence graph 132. These function summaries may be used by step 310, which generates a path-based constraint set for each vulnerability to be analyzed.

Step 310 generates a path-based constraint set for each vulnerability to be analyzed. One embodiment of step 310 is given by this pseudocode listing:

1. Initialize an empty path-based constraint set S.
2. Locate the system dependence graph node corresponding to the vulnerability.
3. Begin to traverse backwards from that node along the control-flow path processing nodes based on their type:
4. For a function entry point node 5. Recursively repeat this procedure on each function that calls this one.
6. For a node that invokes another function
7. Add the function summary constraints of the called function to S.
8. For any other node that affects a buffer variable
9. Add its corresponding constraint to S.
10. Add linking constraints to S that constrain the buffer at this node by its last definition.
11. Return S as the constraint set to be solved in order to determine the safety of the vulnerability in question.

Embodiments of systems and methods for detecting software security vulnerabilities have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be defined by the claims appended hereto, and by their equivalents.

What is claimed is:

1. A method of detecting buffer vulnerabilities in software, comprising:
   receiving a software artifact for analysis;
   receiving a set of buffer vulnerabilities that may exist in the software artifact, wherein a buffer vulnerability is defined as a software feature capable of facilitating attacks against a user of the software;
   at least one of creating and receiving a system dependency graph, the system dependency graph being a representation of (i) possible sequences of instructions that may be encountered if the software artifact were executed, and (ii) possible ways in which variables in the software artifact could have their values defined and used if the software artifact were executed;
   defining constraints for a plurality of program statements of which the software artifact is a component, wherein each of the constraints comprises one or more mathematical assertions describing how a given statement, function or procedure affects the software artifact if the software artifact were executed;
   for each potential buffer vulnerability, tracing through the system dependency graph by visiting statements in the plurality of program statements in a predetermined order determined by the system dependency graph, starting at a location of the potential buffer vulnerability, and collecting the constraints associated with each statement, function or procedure of the software artifact so visited determining a maximum value length that has been assigned to a buffer corresponding to a potential buffer vulnerability and comparing the determined maximum value length to an amount of memory that has been allocated to the buffer to detect a buffer vulnerability; and
   displaying a list of buffer vulnerabilities that are not marked as being safe,
   wherein at least some of the constraints are linking constraints that link values of one variable between two consecutive program statements.

2. The method of claim 1, further comprising generating sets of summary constrains for predetermined statement-sequences, functions or procedures of the software being analyzed, wherein a summary constraint describes where in a given statement, function, or procedure a particular variable is first used and where in the given statement, function or procedure the variable is last defined, wherein a use of a variable is defined as a program statement whose outcome may be affected by the variable's value if the program statement were executed, and wherein a defined variable is defined as a program statement where the variable's value might be modified if the software were executed.

3. The method of claim 2, wherein the constraints are flow-insensitive in that software variables mentioned by the constraints do not include information about where the variable appears in the software artifact source code.

4. The method of claim 3, wherein the software artifact being analyzed is in the form of source code.

5. The method of claim 2, wherein the constraints are not flow insensitive, in that at least some software variables mentioned do include information about where the variable appears in the software artifact source code.

6. The method of claim 5, wherein the software artifact being analyzed is in the form of source code.

7. The method of claim 2, wherein the software artifact being analyzed is in the form of source code.

8. The method of claim 1, wherein the constraints are not flow-insensitive due to the addition of linking constraints, where a linking constraint is a constraint that connects the location where a variable's value is used to the location where the variable is defined.

9. The method of claim 1, wherein the generation of constraints is repeated twice, first using flow-insensitive constraints to rule out a first number of potential buffer vulnerabilities, and then using flow-sensitive constraints to rule out a second number of vulnerabilities, where ruling out a vulnerability comprises determining, based on information in the constraints, that a feature of the software artifact cannot be used in a malicious manner.

10. The method of claim 1, wherein the software artifact being analyzed is in the form of source code.

* * * * *